United States Patent
Garg et al.

(10) Patent No.: US 12,541,511 B2
(45) Date of Patent: Feb. 3, 2026

(54) GENERATION AND USE OF SEARCHABLE GRAPH DATA STRUCTURE BASED ON ONTOLOGICAL KNOWLEDGE

(71) Applicant: SCHLUMBERGER TECHNOLOGY CORPORATION, Sugar Land, TX (US)

(72) Inventors: Neelansh Garg, Menlo Park, CA (US); Christopher Gerard Lunny, Menlo Park, CA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 19/110,827

(22) PCT Filed: Sep. 7, 2023

(86) PCT No.: PCT/US2023/032125
§ 371 (c)(1),
(2) Date: Mar. 12, 2025

(87) PCT Pub. No.: WO2024/058961
PCT Pub. Date: Mar. 21, 2024

(65) Prior Publication Data
US 2026/0010530 A1 Jan. 8, 2026

Related U.S. Application Data

(60) Provisional application No. 63/375,405, filed on Sep. 13, 2022.

(51) Int. Cl.
*G06F 16/2452* (2019.01)
*G06F 16/22* (2019.01)
*G06F 16/242* (2019.01)

(52) U.S. Cl.
CPC ........ *G06F 16/24522* (2019.01); *G06F 16/22* (2019.01); *G06F 16/243* (2019.01)

(58) Field of Classification Search
CPC ... G06F 16/24522; G06F 16/22; G06F 16/243
See application file for complete search history.

(56) References Cited

U.S. PATENT DOCUMENTS

| | | | |
|---|---|---|---|
| 2014/0149446 A1* | 5/2014 | Kuchmann-Beauger | G06F 16/283 707/763 |
| 2015/0066477 A1 | 3/2015 | Hu | |

(Continued)

FOREIGN PATENT DOCUMENTS

WO   2020139861 A1   7/2020

OTHER PUBLICATIONS

International Search Report and Written Opinion of International Patent Application No. PCT/US2023/032125 dated on Dec. 27, 2023, 09 pages.

*Primary Examiner* — Angelica Ruiz
(74) *Attorney, Agent, or Firm* — Jeffrey D. Frantz

(57) ABSTRACT

A method including parsing a natural language query to generate terms. The method also includes linking the terms to entities of a graph data structure including a first layer of nodes connected by edges. The entities are selected from among the nodes and the edges. The graph data structure further includes a meta layer which has tags associated with the edges and the nodes. The tags define an ontology for the entities. A term in the terms is linked to an entity in the entities when the term matches the entity. The method also includes generating a set of paths between selected tags in the meta layer. Each of the selected tags is associated with a corresponding edge in the graph data structure that matches a corresponding term extracted from the natural (Continued)

language query. The method also includes converting the set of paths into a structured query language statement.

20 Claims, 10 Drawing Sheets

(56) References Cited

U.S. PATENT DOCUMENTS

| | | | |
|---|---|---|---|
| 2017/0091636 A1* | 3/2017 | Polyakov | G06Q 10/10 |
| 2019/0138647 A1 | 5/2019 | Kumar | |
| 2019/0272296 A1* | 9/2019 | Prakash | G06F 16/24534 |
| 2020/0074002 A1 | 3/2020 | Kalia | |
| 2020/0311070 A1 | 10/2020 | Yan | |
| 2021/0019309 A1* | 1/2021 | Yadav | G06F 16/2428 |
| 2021/0026846 A1* | 1/2021 | Subramanya | G06F 16/289 |
| 2021/0224488 A1* | 7/2021 | Arya | G06N 5/04 |

* cited by examiner

Algorithm 1 Entity linking algorithm
---
1: procedure ENTITY LINK (*inputPhrase, ontologyIndex, threshold*)
2:   *jaroSim* ← *JaroSimilarity(inputPhrase, ontologyIndex)*
3:   if *max(jaroSim)* ≥ *threshold* then     ▷ match found
4:    *sim* ← *max(jaroSim)*
5:    *match* ← *ontologyindex[argmax(jaroSim)]*
6:    return (*match, sim*)
7:   else     ▷ Try to find entity in lucene index
8:    *match, sim* ← *LuceneSearch(inputPhrase, threshold)*
9:    return (*match, sim*)

FIG. 6

Algorithm 2 Execution plan creation algorithm
---
1: procedure EP (*inputPhrases, matchedEntities*)
Require: *len(inputPhrases) = len(matchedEntities)*
2:   *entityType* ← [] *ExecutionPlan* ← []
3:   for each *e* ∈ *matchedEntities* do
4:    if *e* in *metaOntology.entites* then
5:     *entityType.append(e)*
6:    else
7:     *entityType.append(FindType(e))*
8:   for each (*i, j*) ∈ *permuations(entitytype)* do
9:    *paths* ← *metaontology.findPaths(i, j)*
10:    *paths* ← sort(*paths*, key=lambda x:(-x.contextSim, x.length))
11:    *ExecutionPlan.append(paths[0])*
12:   *ExecutionPlan* ← *RemoveDuplicatePath(Execution Plan)*
13:   *ExecutionPlan* ← *MergeOverlappingPath(ExecutionPlan)*
14:   return *ExecutionPlan*

---
Algorithm 3 SPARQL Generation algorithm
---
1: procedure GENERATESPARQL(*ExecutionPlan*)
2:                  *SPARQL* ← " "
3:                  *variable* ← *set*()
4:          for each *paths* ∈ *ExecutionPlan* do
5:              for each *path* ∈ *paths* do
6:                  for each (*s, p, o*) ∈ *path* do
7:                      if *shouldDisplay*(*s*) then
8:                          *variables.add*(*s*)
9:                    *SPARQL* ← *SPARQL* + *formatTriple*(*s, p, o*)
10: *SPARQL* ← "SELECT" + *variables* + "{" + *SPARQL* + "}"
11: return *SPARQL*
---

FIG. 8

```
80      PREFIX rdfs: <http://www.w3.org/2000/01/rdf-schema#>
81      PREFIX fizz: <https://www.slb.com/fizz/vocab#>
82
83      SELECT * WHERE {
84
85          ?s fizz:meta ?o.
86          ?s rdfs:domain ?domain.
87          ?s rdfs:range ?range.
88
89      }
```

Algorithm 4 Converting ontology to meta-graph

1: procedure GENERATEMETAGRAPH(*MetaAnnotations*)
2:     G ← *DiGraph()*
3:     for each ann ϵ *MetaAnnotations* do
4:         G.addEdge(ann['domain'], ann['range'], label = ann['predicateUse'])
5:     return G

Algorithm 5 Searching meta-graph

1: procedure SEARCHMETAGRAPH (*start, end, G*)
2:     *path = GraphSearch (G, start, End)*  ▷ Any Graph search algorithm like BFS, DFS, Dijkstra can be used depending on the time constrains
3:     return path

FIG. 12

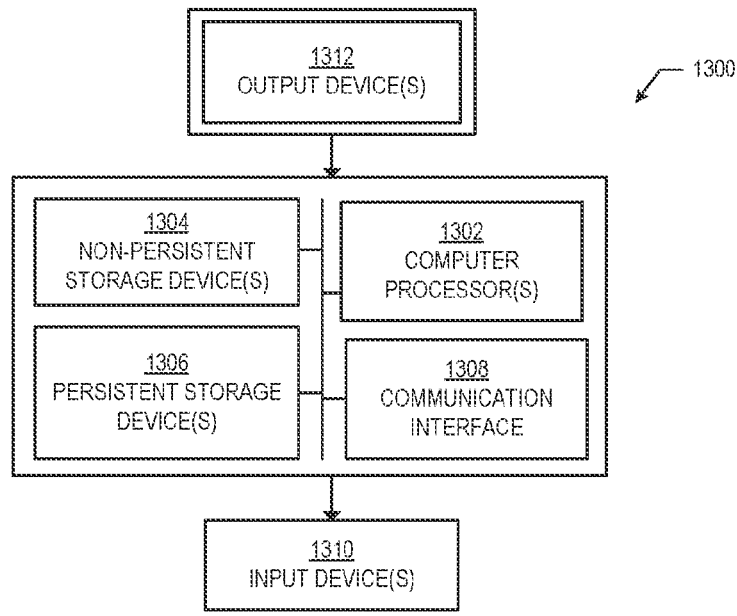
*FIG. 13.1*
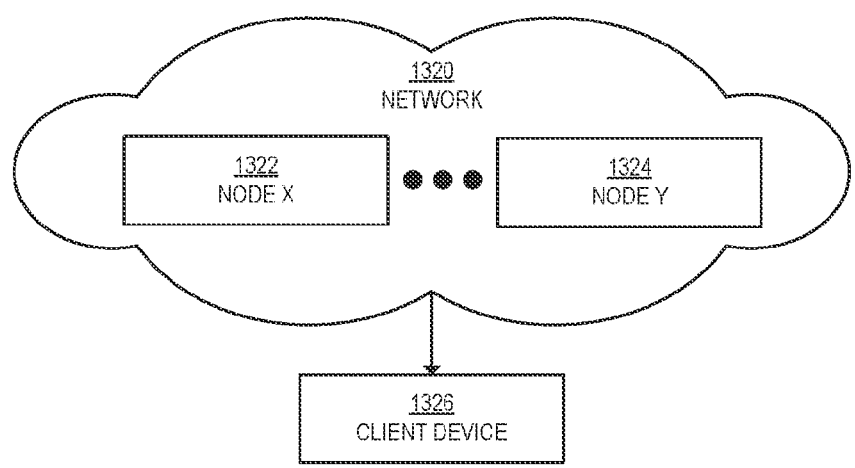
*FIG. 13.2*

GENERATION AND USE OF SEARCHABLE GRAPH DATA STRUCTURE BASED ON ONTOLOGICAL KNOWLEDGE

CROSS REFERENCE PARAGRAPH

This application is the National Stage Entry of International Application No. PCT/US2023/032125, filed Sep. 7, 2023, which claims the benefit of U.S. Provisional Application No. 63/375,405, entitled "GENERATION AND USE OF SEARCHABLE GRAPH DATA STRUCTURE BASED ON ONTOLOGICAL KNOWLEDGE," filed Sep. 13, 2022, the disclosure of which is hereby incorporated herein by reference.

BACKGROUND

A natural language query is a query that takes the form of a clause or sentence in a language such as English, French, German, Spanish, Japanese, Chinese, Portuguese, etc. While natural language queries may be easier for a user to understand, a natural language query sometimes cannot be parsed by a computer.

For data stored in some databases, including some graph databases and relational databases, a natural language query cannot be used to retrieve information in the database. However, many users are not familiar with how to form a properly structured query language statement. When structured query language statements are incorrectly formed, the query processor on the computer system may be unable to respond or may provide a false response to the user query.

SUMMARY

One or more embodiments provide for a method including parsing a natural language query to generate terms extracted from the natural language query. The method also includes linking the terms to entities of a graph data structure. The graph data structure includes a first layer of nodes connected by edges. The entities are selected from among the nodes and the edges. The graph data structure further includes a meta layer which has tags associated with the edges and the nodes. The tags define an ontology for the entities. A term in the terms is linked to an entity in the entities when the term matches the entity. The method also includes generating a set of paths between selected tags in the meta layer of the graph data structure. Each of the selected tags is associated with a corresponding edge in the graph data structure that matches a corresponding term extracted from the natural language query. The method also includes converting the set of paths into a structured query language statement.

Other aspects of one or more embodiments will be apparent from the following description and the appended claims.

BRIEF DESCRIPTION OF DRAWINGS

FIG. 6 shows an algorithm for linking phrases to an ontology, in accordance with one or more embodiments.

FIG. 7 shows an algorithm for generating an execution plan, in accordance with one or more embodiments.

FIG. 8 shows an algorithm for generating a structured query which can be executed on a graph data structure using a structured query language endpoint, in accordance with one or more embodiments.

FIG. 10 shows pseudocode for an algorithm for retrieving edges which have a desired meta annotation, in accordance with one or more embodiments.

FIG. 11 shows an algorithm for converting information in edges obtained in the algorithm of FIG. 8 to convert the edges to a searchable graph, such as shown in FIG. 7, in accordance with one or more embodiments.

FIG. 12 shows an algorithm for searching relations in a searchable graph, such as shown in FIG. 7, in accordance with one or more embodiments.

FIG. 13.1 and FIG. 13.2 show examples of a computing system and a computer network, in accordance with one or more embodiments.

Like elements in the various figures are denoted by like reference numerals for consistency.

DETAILED DESCRIPTION

Figure 1:
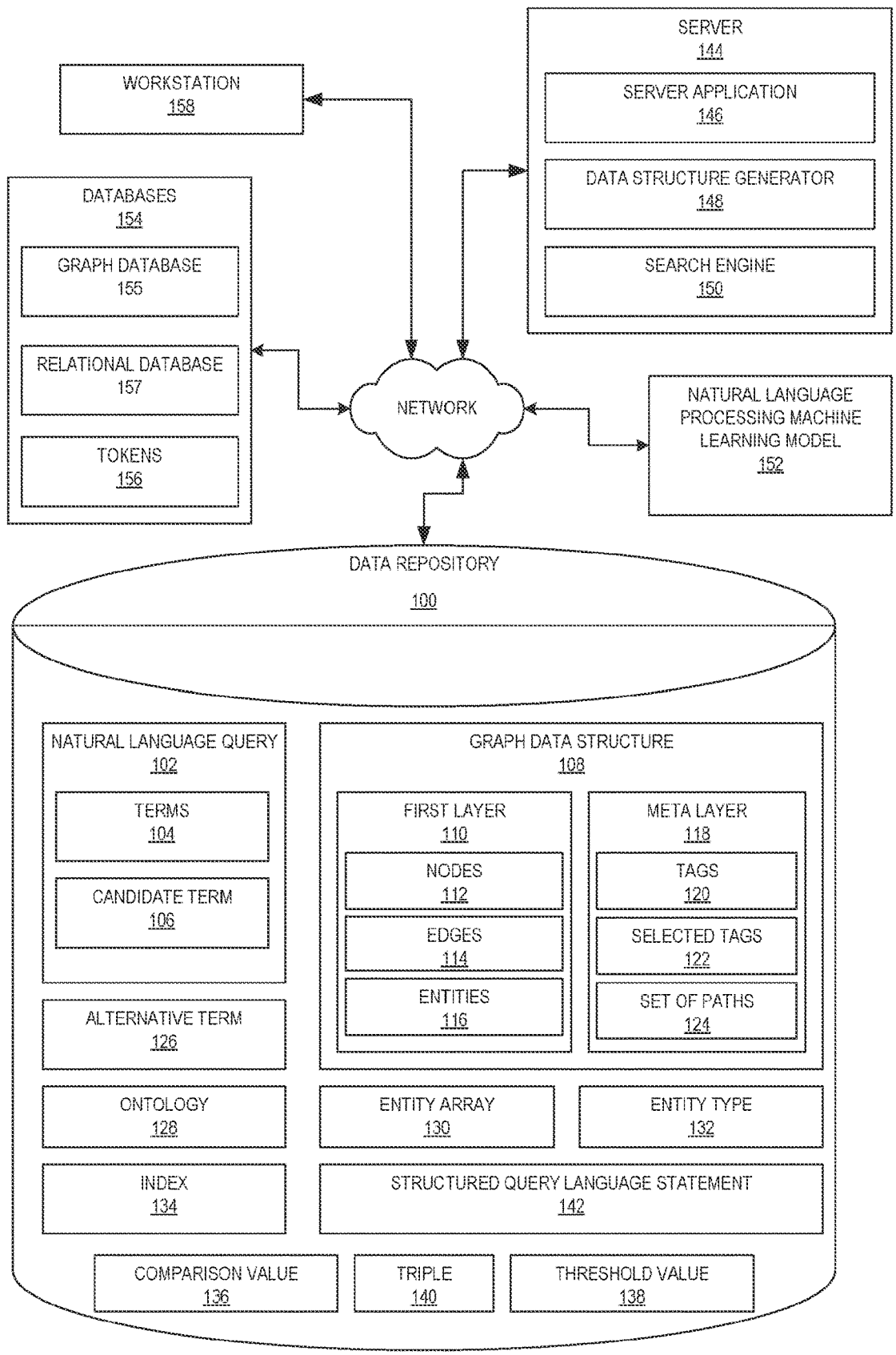
FIG. 1 shows a computing system, in accordance with one or more embodiments.

One or more embodiments relate to converting a natural language query into a well-formed structured query language that can be executed on a database, such as but not limited to a resource description framework (RDF) based triple store, a knowledge graph, or other graph databases. A structured query is a query in a structured data language. Thus, for example, one or more embodiments may be used to convert an English language query into a query written in the language known as 'semantic protocol and RDF query language,' or "SPARQL."

One or more embodiments represent a technical solution that addresses a technical problem. Generating a structured query from a natural language query can be very open-ended, and hence indefinite. Due to the constraints on a structured language queries, which may be database or data structure dependent as well as term specific, it is not straightforward to simply pick a word or words in a natural language query and place the word(s) into a structured query language statement. The implicit ontological relationships between words in a natural language query may not be preserved when converting the natural language query to a structured query language. Accordingly, direct translation from a natural language query to a structured query language statement may fail to return desired results.

Because the schema of the data may not match the structured query, the structured query language (when executed) will return wrong or undesirable results. Many different, and possibly contradictory, structured language queries could be possible from a single natural language query. Thus, a serious technical problem exists in automatically converting a natural language query to a structured query language.

As indicated above, one or more embodiments provide a technical solution to the above-described technical problem.

In summary, the structured query is formed from the natural language query using an multi-layer graph data structure. The graph data structure has at least a first layer of nodes representing terms connected by edges representing relationships among the nodes. The graph data structure has at least a second layer of tags associated with the edges and the nodes. The tags at least represent the ontological entity types of the edges and the nodes. When a natural language query is received, the natural language query is parsed into terms. The terms are linked to nodes and edges in the first layer of the graph data structure. A set of paths is then found between the tags in the meta layer of the graph data structure. The set of paths is then converted into the structured query language statement. Further details of the conversion process are described below with respect to the figures.

Thus, one or more embodiments improved the computer as a tool by improving the automated conversion process of a natural language statement to a structured language statement. The structured language statements generated by one or more embodiments are more accurate conversions of the natural language statements, and thus are more likely to return relevant results to a user.

Another technical problem addressed by one or more embodiments is how to automatically build the multi-layer graph data structure described above. The technical solution to this problem is described in detail below but, briefly, the graph data structure may be built from a database or from a set of terms, plus an ontology that defines the relationships among the terms. The first layer of the graph data structure is formed by using the terms and the ontology to form nodes (the terms) and edges (the relationships between the terms). The second layer of the graph data structure is formed by annotating the edges of the first layer with tags that at least identify entity types of the edges, and possibly of the adjoining nodes. The tags may define other information, such as alternative terms. The tags form the meta layer of the graph data structure. The use of the resulting multi-layer graph data structure is summarized above, and described in more detail below with respect to the figures.

Attention is now turned to the figures. FIG. 1 shows a computing system, in accordance with one or more embodiments. The system shown in FIG. 1 includes a data repository (100). The data repository (100) is a type of storage unit and/or device (e.g., a file system, database, data structure, or any other storage mechanism) for storing data. The data repository (100) may include multiple different, potentially heterogeneous, storage units and/or devices.

The data repository (100) may store a natural language query (102) that is received from a workstation, such as the workstation (158) described further below. For example, a user may enter the natural language query (102) via a user interface and user input device of the workstation (158). Continuing the example, the natural language query (102) may be "find wells located in Texas," as described further with respect to FIG. 4 through FIG. 12.

The data repository (100) also may store one or more terms, such as the terms (104). The terms (104) are strings of text within the data repository (100). For example, the terms (104) may be words, phrases numbers, special characters (e.g., "*", "!", "@", "#", etc.) or other strings of text. In the above example, the words "find," "wells," "located," "in," and "Texas" are the terms (104) in the natural language query (102).

The data repository (100) also may store one or more candidate terms, such as the candidate term (106). The candidate term (106) is one of the terms (104). In particular, the candidate term (106) is a term that is under consideration during the method of FIG. 2 for determining whether the candidate term (106) should be linked to one of the nodes or edges in the first layer (110) of the graph data structure (108), as described further below.

The data repository (100) also may store the graph data structure (108). The graph data structure (108) may be a non-linear data structure including nodes that are memory blocks and edges that are stored relationships between the memory blocks. More formally, the graph data structure (108) is a data set, stored on the data repository (100), that is composed of a set of nodes (N) and a set of edges (E) that specify the relationships among the nodes, N.

The graph data structure (108) of one or more embodiments is a multi-layer graph data structure. The graph data structure (108) of one or more embodiments has two layers, a first layer (110) and a meta layer (118) (the meta layer (118) also may be referred-to as a "second layer." The meta layer (118) may define ontological relationships of entity types among the nodes and edges, as described further below. An "ontological relationship," in an ontology, specify how one object in the ontology relates to another object in the ontology. An entity type is a classification for an object.

For example a "car" (object) may be an "automobile" (entity type). The "automobile" may have an ontological relationship with the entity type of some other object. For example, a "truck" (object) may be an "automobile" (entity type). In this case, the car and the truck have matching entity types, so that the "ontological relationship between the entity types" of the "car" and the "truck" is a "match." However, the entity type of a "boat" (object) may be "vehicle" (entity type). While an automobile (entity type 1) is a type of "vehicle" (entity type 2), the two entity types do not match, but rather share a superclass-subclass relationship (i.e. a "vehicle" is a superclass (a broader category) of an "automobile" (the subclass, or narrower class)). In both example, an ontological relationship exists between the defined entity types.

As indicated above, the first layer (110) is composed of the nodes (112) and the edges (114). The nodes (112) are objects in the graph data structure (108) that have associated properties. For example, one the nodes (112) may be "well 259," which is a well located in Texas and which has various properties, such as location, exploration and production stage, depth, etc.

The edges (114) are objects in the graph data structure (108) that have associated properties defining the relationships among the nodes (112). For example, one of the edges (114) may connect the "well 259" node to another node that is named "Texas wells," and the name of that edge is "is contained in." Thus, the well 259 is contained in the set of Texas wells.

The first layer (110) also includes one or more entities (116). An "entity" is an object selected from among the nodes (112) and the edges (114) in the graph data structure (108). More particularly, as described further with respect to FIG. 2, the entities (116) are those ones of the nodes (112) and the edges (114) that are linked to the terms (104) of the natural language query (102). For example, if the term "well" is a node in the graph data structure (108), and the term "well" exists in the natural language query (102), then the term "well" is an "entity" as defined herein.

The graph data structure (108) also includes the meta layer (118). The graph data structure (108) is one or more tags (120) that are associated with the nodes (112) and the edges (114) of the first layer (110) of the graph data structure (108). The tags (120) store information about the edges (114) or about the nodes (112). For example, the tags (120)

may contain data that identifies an entity type (132) (defined below) of a corresponding edge that connect two of the nodes (112), or of either of the two nodes. In another example, the tags (120) may contain data that identifies the entity type (132) of one or more of the nodes (112). Thus, the tags (120) may be associated with either nodes (112), the edges (114), or both.

The tags (120) may contain additional information, such as but not limited to alternative terms for either of the two nodes or the edge that connects the two nodes. The tags (120) may contain still other types of information, such as additional information supplied by a user or technician responsible for building or maintaining the graph data structure (108).

Among the tags (120) may be one or more selected tags (122). The selected tags (122) are tags that have been selected as part of the process that converts the natural language query (102) to the structured query language statement (142), as described further with respect to FIG. 2. Briefly, the selected tags (122) are those tags in the meta layer (118) that have been associated with the terms in the natural language query. It is not necessary that the selected tags (122) share a common ontological definition (i.e., have common entity types).

A set of paths (124) may exist in the ontology (128). The set of paths (124) is a set of paths that could exist among the selected tags (122). The set of paths (124) are between those of the tags (120) that are linked to the entities (116) of the first layer (110) of the graph data structure (108). Selection and treatment of the set of paths (124) is described with respect to FIG. 2.

The data repository (100) also may store one or more alternative terms, such as the alternative term (126). The alternative term (126) is a word or text string that may have a same or similar semantic meaning as the words or text strings that make up the nodes (112) or the edges (114) of the first layer (110) of the graph data structure (108). For example, the words "wells," "wellbores," and "bore holes" may be considered alternative terms for the word "well," or in another example the phrase "one hundred eleven" may be an alternative term for the number text string "111." As described above, the alternative term (126) may be stored in one or more of the tags (120).

In other embodiments, the graph data structure (108) may have addition layers that further abstract the entity definitions, such as by arranging the entity types of the tags (120) into more abstract groupings of entities. For example, the nodes (112) of the first layer (110) may be instances of entities, and the edges (114) may be the relationships among those entities. The tags (120) specify the entity types of the entities. A third layer (or a still higher order layer) may define the types of the entity types. As a specific example, if one of the nodes (112) is "well," then one of the tags (120) may specify the entity type as "oil field entities" and a higher order layer may identity the type of the entity type as being "nouns."

The data repository (100) also may store one or more ontologies, such as the ontology (128). The ontology (128) is data that represents meaning relationships among text strings, such as the terms (104). The ontology (128) defines the properties of text strings and how the text strings are related. The ontology (128) defines a set of concepts and categories that represent the subject of the concepts. More generally, the ontology (128) encompasses a representation, formal naming, and definition of the categories, properties, and relations between the concepts, data, and entities that form the graph data structure (108).

An example of the ontology (128) may be a defined ontology of terms as specified by the web ontology language (OWL). The OWL is a semantic web language that is designed to process and integrate information over the Internet in a human-readable manner. However, the OWL is formatted to allow automatic machine processing of an ontology definition.

However, the ontology (128) may be other types of ontologies. Examples of ontologies are the schema.org ontology, a GForge ontology, the simple knowledge organization system (SKOS), and possibly many others. In an embodiment, the ontology (128) is based on the resource description framework (RDF).

The ontology (128) may be used as part of the process of building the graph data structure (108). The process of building the graph data structure (108) is described with respect to FIG. 3.

The data repository (100) also may store one or more entity arrays, such as the entity array (130). The entity array (130) is a list of those of the entities (116) that have matching entity types when the set of paths (124) is identified, as described with respect to FIG. 2. Thus, the entity array (130) is a list of entities that have matching entity types, as defined below. Again, the entity types of the entities is stored in the tags (120) of the meta layer (118) of the graph data structure (108).

The data repository (100) also stores one or more entity types, such as the entity type (132). The entity type (132) is an ontological type of an entity. For example, if the entity is "apple," then the corresponding entity type (132) may be "fruit." In other words, the entity type (132) may be characterized as a category under which the entity in question is categorized.

The data repository (100) also may store one or more indices, such as the index (134). The index (134) is a list of text strings (word, phrases, numbers, special characters, etc.) contained in the tags (120) of the meta layer (118) of the graph data structure (108). As described with respect to FIG. 2, the index (134) may be used during the entity linking block in which the terms (104) of the natural language query (102) are matched to a list of phrases generated from the meta layer (118) of the graph data structure (108).

The data repository (100) also stores one or more comparison values, such as the comparison value (136). The comparison value (136) is also used during the entity linking block described with respect to FIG. 2. Briefly, the terms (104) of the natural language query (102) are compared to the terms present in the first layer (110) of the graph data structure (108). The comparison value (136) is one of the values generated by that comparison. The comparison process is also described with respect to FIG. 2.

The data repository (100) also stores one or more threshold values, such as the threshold value (138). The threshold value (138) is a pre-defined number or text benchmark against which the comparison value (136) is compared during the linking process described with respect to FIG. 2. The threshold value (138) may be, for example, a number between 0 and 1, by may be some other number, or if called-for by the comparison value, some other text string.

Briefly, when the comparison value (136) satisfies the threshold value (138), then a term (from the terms (104) of the natural language query (102)) is deemed linked to one of the entities (116) of the first layer (110) of the graph data structure (108). The term "satisfies" means "to meet a precondition." For example, the comparison value (136) may satisfy the threshold value (138) when the comparison value (136) is equal to or exceeds the threshold value (138).

However, the threshold value (138) may be deemed satisfied under some other pre-defined condition.

The data repository (100) also may store one or more triples, such as the triple (140). The triple (140) is a set of text strings that defines a subject, a predicate, and an object of a structured language statement. The triple (140) is defined based on the selected path within the set of paths (124) of the meta layer (118) of the graph data structure (108). The triple (140) may be defined within one or more of the selected tags (122), or may be taken from the terms used for the nodes (112) or the edges (114) of the first layer (110) of the graph data structure (108) in some embodiments.

The data repository (100) also may store one or more structured query language statements, such as the structured query language statement (142). The structured query language statement (142) is a set of text strings (e.g., the triple (140) or combinations of multiple triples) that is structured in a structured query language. A structured query language is used in programming and designed for managing data held in a database. An example of a structured query language for use with graph databases, such as graph database (155), is SPARQL, as mentioned above. However, one or more embodiments may be used to generate structured query language statements in other structured query language programming languages.

Figure 2:
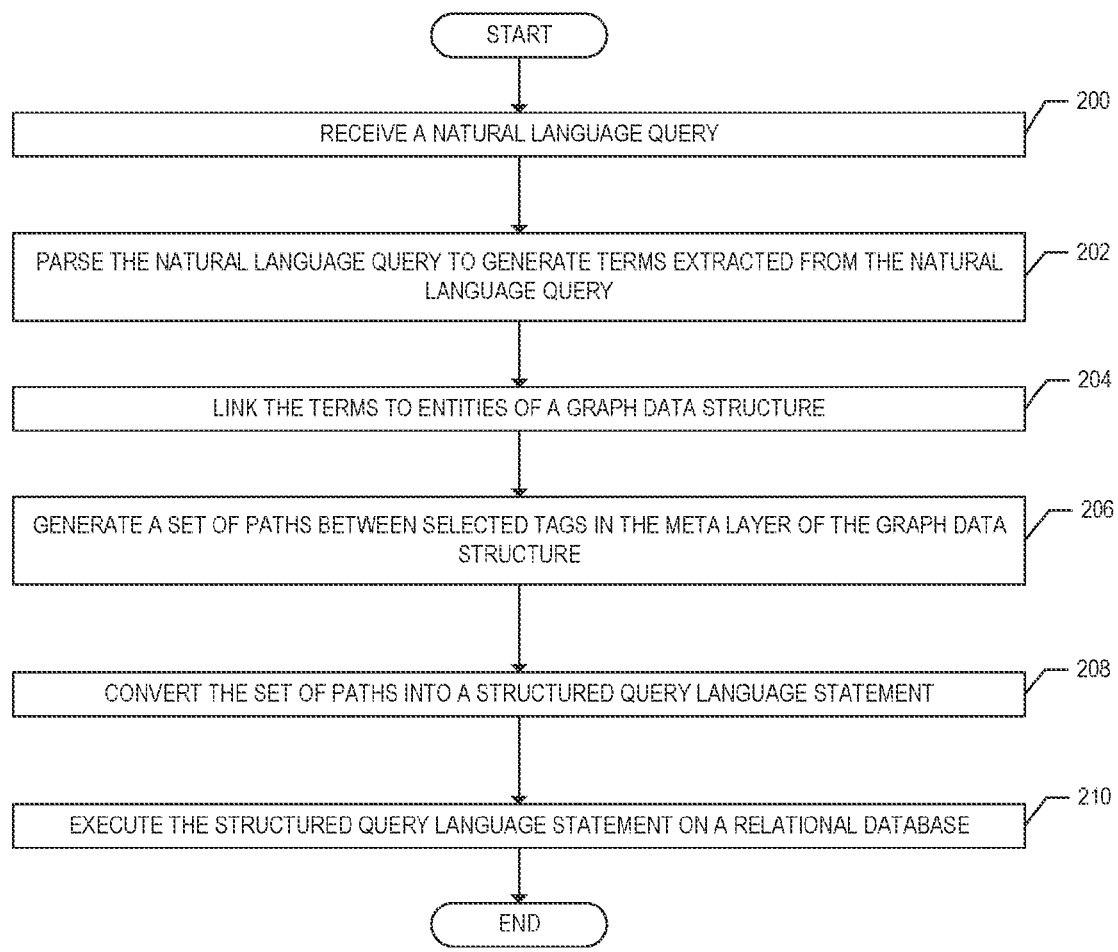
FIG. 2 shows a flowchart of a method for automatically converting a natural language query to a structured query language statement, in accordance with one or more embodiments.

Generation of the structured query language statement (142) is described with respect to FIG. 2. Subsequent use of the structured query language statement (142) may be to submit the structured query language statement (142) as a query to a graph database (155), described further below. When executed by a computer, the structured query language statement (142) will be submitted to the graph database (155), the result of which is a return of information stored in the graph database (155).

The system shown in FIG. 1 may include other components. For example, the system may include a server (144). The server (144) is one or more computers or computing hardware, possibly in a distributed computing environment. The server (144) may include the data repository (100), one or more processors, and other computing equipment. An example of the server (144) may be the computing system described with respect to FIG. 13.1 and FIG. 13.2.

The server (144) may execute a server application (146). The server application (146) is software or application specific hardware that may be used to execute computer readable program code that implements the methods described with respect to FIG. 2, or the example described with respect to FIG. 4 through FIG. 12. Examples of some of the program code that may form the server application (146) are shown in the pseudocode of FIG. 6 through FIG. 8 and FIG. 10 through FIG. 12.

The server (144) may execute a data structure generator (148). The data structure generator (148) is software or application specific hardware that may be used to execute computer readable program code that implements the methods described with respect to FIG. 3, or the example described with respect to FIG. 4 through FIG. 12. Examples of some of the program code that may form the server application (146) are shown in the pseudocode of FIG. 6 through FIG. 8 and FIG. 10 through FIG. 12.

The server (144) may execute a search engine (150). The search engine (150) is software or application specific hardware that may be used to execute the structured query language statement (142) in order to retrieve desired information from the graph database (155).

The system shown in FIG. 1 also may include a natural language processing machine learning model (152). The natural language processing machine learning model (152) may be executed by the server (144) in some embodiments, but may be executed by a separate computing system. The natural language processing machine learning model (152) is a machine learning algorithm that takes, as input, the natural language query (102) and generates, as output, the terms (104).

The system shown in FIG. 1 also may include one or more databases (154). The databases (154) may be stored in the data repository (100) in some embodiments, but are shown as separate entities as the databases (154) could be stored in some other non-transitory computer readable storage medium which may, or may not, be part of the system shown in FIG. 1. While the term "databases" is used, the term "the databases (154)" include the possibility of one database (in this case, the graph database (155). Similarly, reference to a single database automatically contemplates the use of multiple databases of either type described herein.

The databases (154) include a graph database (155). The graph database (155) is a database that uses graph structures for semantic queries with nodes, edges, and properties to represent and store data. The nodes contain data and the edges establish the relationships among the data. Thus, the graph database (155) is similar to the graph data structure (108). Indeed, in an embodiment, the graph data structure (108) may be built from the graph database (155), or may also be built from the relational database (157). In any case, the graph database (155) may store information of interest to the user.

The databases (154) also may include one or more relational databases, such as relational database (157). A relational database is a database based on the relational model of data, as proposed by E. F. Codd. A system used to maintain relational databases is a relational database management system (RDBMS). Many relational database systems are equipped with the option of using SQL (Structured Query Language) for querying and updating the database, though the SPARQL language is intended to be used with respect to the graph database (155).

Like the graph database the graph database (155) the relational database (157) also may contain information of interest to a user. In an embodiment, the relational database (157) may be used to generate the graph database (155).

The relational database (157) may store multiple tokens (156). The tokens (156) are text strings (e.g., words, phrases, numbers, special characters, etc.) that represent the information stored in the relational database (157). Mappings may be used to map a schema from the relational database (157) to the ontology (128) so that the tokens (156) inside the relation database (157) may be converted to the graph database (155).

In any case, the graph data structure (108) permits the terms (104) of the natural language query (102) to be related to the tokens (156) of the relational database (157) after the relational data is converted to the graph form using the mapping and is loaded in the graph database. Thus, the structured query language statement (142) that is generated according to the method of FIG. 2 will use text strings that can be matched to relations stored in the graph database (155).

The system shown in FIG. 1 also may include a workstation (158), though the workstation (158) may be external to the system of FIG. 1 in some embodiments. For example, the workstation (158) may be a third party computer that has been granted a paid, cloud-based access to the system of FIG. 1. The workstation (158) is one or more computing systems, such as the computing system described with respect to FIG. 13.1 and FIG. 13.2. The workstation (158) may include, for example, a user interface and one or more user input devices that permit a user to submit the natural language query (102) to the system of FIG. 1, and to review the returned output of execution of the structured query language statement (142).

While FIG. 1 shows a configuration of components, other configurations may be used without departing from the scope of one or more embodiments. For example, various components may be combined to create a single component. As another example, the functionality performed by a single component may be performed by two or more components.

FIG. 2 shows a flowchart of a method for automatically converting a natural language query to a structured query language statement, in accordance with one or more embodiments. The method of FIG. 2 may be executed using the system shown in FIG. 1. A specific example of the method of FIG. 2 is shown in the method of FIG. 4 through FIG. 12.

Block 200 includes receiving a natural language query. The natural language query may be received from a workstation, or may be received automatically by some other software that calls the method of FIG. 2 to generate a structured language statement.

Block 202 includes parsing the natural language query to generate terms extracted from the natural language query. The natural language query may be parsed by providing the natural language query as input to a natural language processing machine learning model. The output of the model is the extracted terms. However, the natural language query also may be parsed by using a set of automated rules executed to identify text strings that form individual words, phrases, or numbers. The individual words, phrases, or number may form the extracted terms.

The parser used in Block 202 may take the form of a natural language processing (NLP) model. An example of an NLP model is SPACY®, by ExplosionAI GmbH UG. For, example, a SPACY® transformer model may be used as the base embedding model for the parsers. The position tags and dependency parsers are also provided by SPACY®. In an embodiment, a named entity recognition (NER) model may be trained on top of the SPACY® transformer model to perform entity resolution. The data for training the NER model may be generated from inside the graph data structure, though the data may be augmented by a user in some cases. Custom entity extraction rules may be used to identify noun phrases and verb phrases in this block.

Block 204 includes linking the terms to entities of a graph data structure. As discussed above in FIG. 1, the graph data structure includes a first layer composed of nodes connected by edges. The entities are selected from among the nodes and edges. The graph data structure further includes a meta layer including tags associated with the edges and the nodes. The tags define an ontology for the entities. A term is linked to an entity when the term matches the entity.

Linking may be performed by generating a comparison value. The comparison value is generated by comparing a candidate term, selected from among the terms of the natural language query, to an index generated from the graph data structure. The index includes the selected entities of the graph data structure. The index also may include other entities in the graph data structure, optionally. The comparison value is generated by comparing the candidate term to a selected entity of the entities in the index. The comparison value may be generated, for example, using the Jaro-Winkler similarity test, as described further in the example of FIG. 4 through FIG. 12.

The comparison value is compared to a threshold value. When the comparison value satisfies the threshold value, the candidate term is linked to the selected entity. Satisfying the threshold value may include one or more of several conditions being met. The conditions may be the comparison value exceeding (or being less than in some cases) the threshold value. The conditions may be the comparison value meeting or exceeding the comparison value.

In more detail, once the phrases are identified in block 202, one or more embodiments use an entity linking algorithm to link the phrases to ontology or the entities inside the graph data structure. An example of such a linking algorithm is shown in the pseudocode shown in FIG. 6. The linking algorithm takes the input phrase, an index, and a threshold value, above which the match is acceptable. The index is the list of phrases generated from the meta layer of the graph data structure that can be matched to the input phrase. This approach helps the algorithm obtain a better coverage as the user can refer a single entity with multiple names. For example, the term "wells" can also be referred to as wellbores or oil wells. A detailed example of linking is described with respect to FIG. 6.

In an embodiment, at least some of the tags further define a corresponding alternative term for a corresponding term in the terms extracted from the natural language query. In this case, linking at block 204 also may include linking the corresponding term to a corresponding entity when the corresponding alternative term matches the corresponding entity. In other words, linking might be based on an alternative term, rather than on an exact match.

Block 206 includes generating a set of paths between selected tags in the meta layer of the graph data structure. The selected tags are selected from among the available tags in the meta layer. Each of the selected tags is associated with a corresponding edge in the graph data structure that matches a corresponding term extracted from the natural language query.

Generating the set of paths may include identifying a subset of edges in the first layer of the graph data structure that correspond to the selected tags. Then, the subset of edges is converted into a corresponding triples. Each triple includes a corresponding subject, a corresponding predicate, and a corresponding object that may be used in a structured query language. Thereafter, as described further below, the triple may be converted into the structured query language statement.

In another embodiment, generating the set of paths at block 206 may be performed by checking whether a selected entity in the set of entities associated with the extracted terms has a corresponding tag. As described with respect to FIG. 1, the tag represents a corresponding ontological definition. Thus, the selected entity is identified as having an entity type (defined by the ontological definition) of the corresponding tag. When multiple selected entities have been found, then one or more paths may be drawn among the selected tags of the selected entities. The one or more paths can then be used to identify the structured query language, as defined further below.

In a specific example, generating the paths may include adding, when the selected entity has the corresponding tag, the selected entity to an entity type array. When the selected entity does not have a corresponding tag, an entity type of the selected entity may be determined using a find type procedure (see FIG. 7, for example). The determined entity type may then be labeled as the identified entity type for that selected entity. Then, the selected entity is added to the entity array as having the determined entity type. In either case (identified or determined entity types for a selected entity), the selected entity is identified as having the entity type corresponding to the identified entity type. The set of paths include those paths between the tags in the meta layer that have the identified entity types.

There may be more than one entity type among different selected entities. Thus, there may be multiple paths in the set of paths. For example, if there were three selected entities associated with the natural language query terms, then there would be multiple paths in the set of paths. There could also be multiple paths connecting any two identified entity types. Stated differently, it may be possible that there are many paths among entities in the entity array.

When multiple paths exist, it may be desirable to reduce the number of paths available. Thus, for example, block 206 may include merging overlapping paths from the available identified paths. Similarly, block 206 also may include removing duplicate paths from the available identified paths.

Additionally, the set of paths may be further reduced by selecting the set of paths from the available paths, that remain after merging or removing overlapping and duplicate paths, using a highest context similarity metric. Then, the final set of paths may be selected as being those one (or more) paths that have the shortest length path. The highest context similarity metric may be determined using a Jaccard similarity between an identified path and one or more linked entities. The linked entities are those entities in the graph data structure that were linked to the terms of the natural language query.

Ultimately, the final set of paths may be converted to the structured query language. The conversion procedure is described with respect to block 208.

Further examples and details regarding the generation of the set of paths are provided in the example described with respect to FIG. 4 through FIG. 12. Thus, one or more embodiments are not necessarily limited to the examples set forth for block 206 of FIG. 2.

Block 208 includes converting the set of paths into a structured query language statement. Converting may include converting the set of paths into corresponding triples of a corresponding subject, a corresponding predicate, and a corresponding object. Then, the corresponding triples are combined into the structured query language statement.

The algorithm of FIG. 8 may be used to implement block 208. As shown in FIG. 8, the conversion algorithm goes through each path identified in the set of paths. Inside each path, the algorithm goes through each edge of the path. Each edge is converted into a triple of subject, predicate, and object. The algorithm determines if a uniform resource indicator (URI) of a selected entity in the path is an entity or entity type, or if the URI should be skipped. The variable which should be displayed is tracked and, in the end, results are combined to generate an executable SPARQL, as shown in line 11 of FIG. 8.

In an embodiment, the method of FIG. 2 may terminate thereafter. However, the method also may include block 210, which includes executing the structured query language statement on a knowledge graph or a graph database. The results of the structured query language are then returned to the workstation of the user. Again, the method of FIG. 2 may terminate thereafter.

However, still other variations are possible. For example, the method of FIG. 2 may include first building, prior to linking, the graph data structure from a relational database. In this case, the method includes building the first layer of the graph data structure from the relational database, and building, after building the first layer, the meta layer of the graph data structure. However, the graph data structure also may be built from other types of databases, including other graph databases. Building the meta layer may include receiving the tags; and associating the tags with corresponding ones of the edges. Still other variations are possible.

Figure 3:
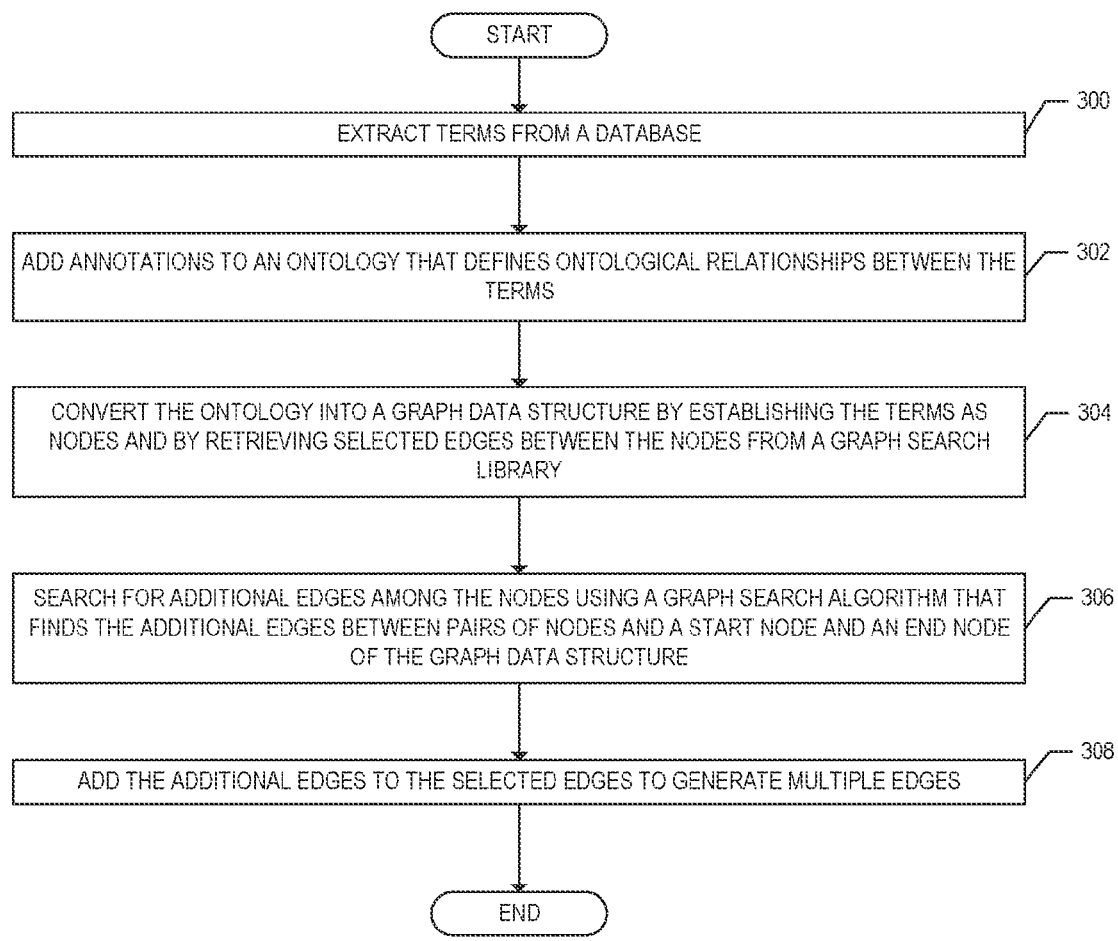
FIG. 3 shows a flowchart of a method for building a multi-layer graph data structure having a first layer and a meta layer, in accordance with one or more embodiments.

FIG. 3 shows a flowchart of a method for building a multi-layer graph data structure having a first layer and a meta layer, in accordance with one or more embodiments. The method of FIG. 3 may be executed using the system shown in FIG. 1.

Block 300 includes extracting terms from a database. Extracting may be performed by reading database and adding the data therein to a list of terms that will become the nodes of a graph data structure. Again, the database may be a relational database, a graph database, or some other source of information.

Block 302 includes adding annotations to an ontology that defines ontological relationships between the terms. Later, the relationships from the ontology will form the edges of the graph data structure, and the annotations will form the tags that form the meta layer of the graph data structure. Block 302 thus creates a foundation for creating the multi-layer graph data structure by adding the annotations (of the meta layer) to the ontology that will be used to establish the edges (relationship) between the nodes (terms of the relational database structure).

The protégé user interface may be used to add the annotations, though other ontology editors also can be used. The meta-annotations will be used to select relevant edges from the ontology, as described above with respect to FIG. 2. By adding the annotations, the path search algorithm is restricted to take the relevant edges into account while generating the execution plan. Without the annotations and the complete ontology, the path search algorithm may generate irrelevant paths that generally go through the top level class in the ontology.

Block 304 includes converting the ontology into a graph data structure by establishing the terms as nodes and by retrieving selected edges between the nodes from a graph search library. The selected edges have the annotations.

FIG. 8 shows an algorithm that can be used to retrieve the edges which have the meta-annotation. Using the algorithm of FIG. 8, the edges, "s" are obtained. The edges have a meta-annotation and their respective domain and range. Then the algorithm of FIG. 9 may be used to convert this knowledge into a search able graph.

Block 306 includes searching for additional edges among the nodes using a graph search algorithm that finds the additional edges between pairs of nodes in and a start node and an end node of the graph data structure. For any given two nodes inside the graph data structure, a graph search algorithm may be used to search for paths or relations between the start and end nodes. Examples of such graph search algorithms include a breadth first search (BFS) algorithm, a depth first search (DFS) algorithm, or a Dijkstra algorithm. An example of a query for searching relations in a graph is shown in FIG. 10.

Block 308 includes adding the additional edges to the selected edges to generate multiple edges. After extracting, adding the annotations, converting, searching, and adding the additional edges, the graph data structure now has a first layer that includes the nodes connected by the edges and a meta layer including the annotations associated with the edges. The resulting graph data structure is a multi-layer graph data structure, as described with respect to the graph data structure (108) in FIG. 1.

As shown, creation of the meta layer may include three main blocks. The first block adds annotations on an existing ontology using "meta" tags. The second block converts the ontology into the graph using graph search libraries. The third block searches relations in the graph using graph search algorithms.

While the various blocks in the flowcharts of FIG. 2 and FIG. 3 are presented and described sequentially, at least some of the blocks may be executed in different orders, may be combined or omitted, and at least some of the blocks may be executed in parallel. Furthermore, the blocks may be performed actively or passively.

Attention is now turned to FIG. 4 through FIG. 12. FIG. 4 through FIG. 12 show an in-use example of one or more embodiments described with respect to FIG. 1 through FIG. 3. The following example is for explanatory purposes and not intended to limit the scope of one or more embodiments.

Figure 4:
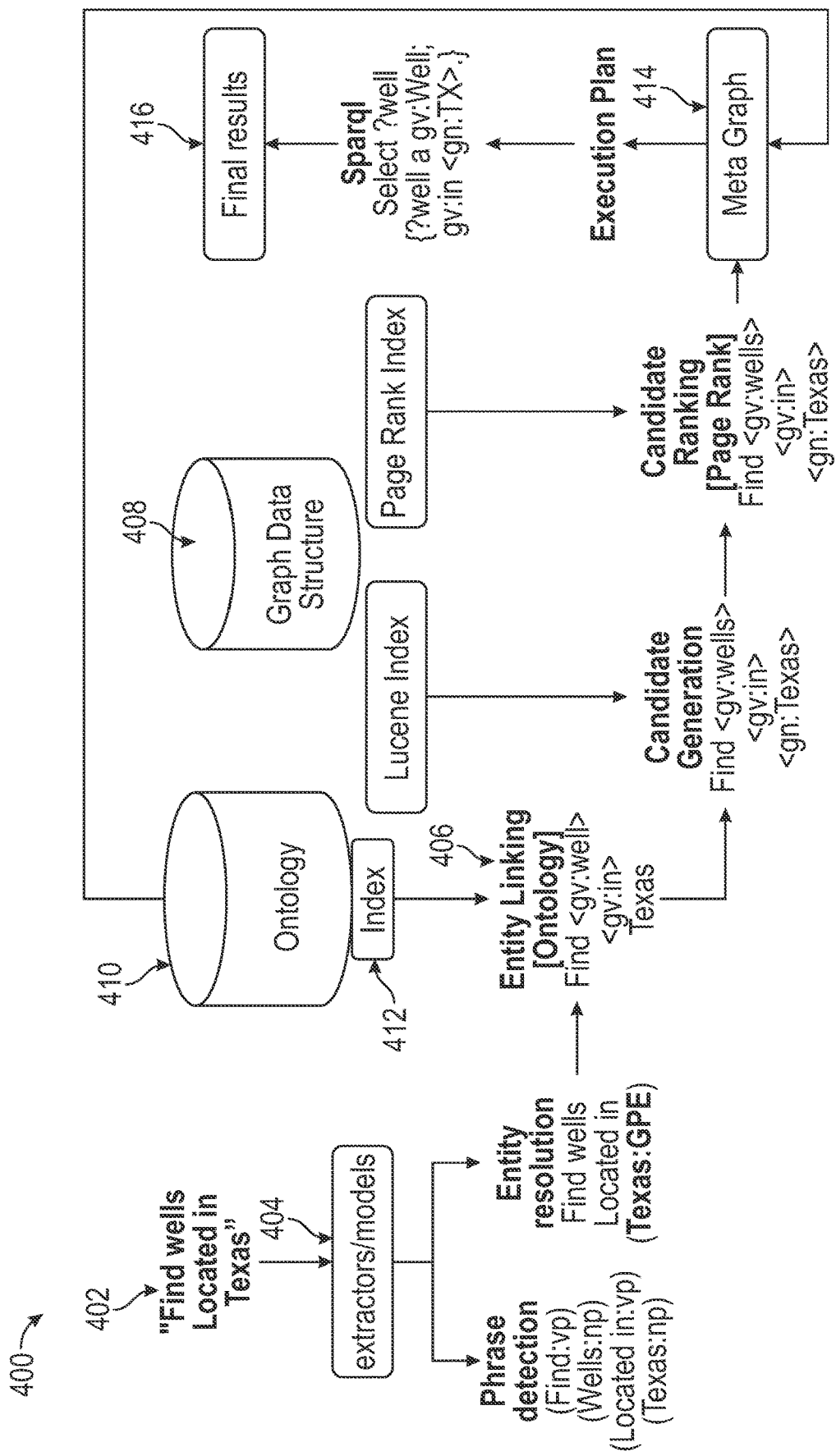
FIG. 4 shows an example architecture for converting a natural language query to a structured query, in accordance with one or more embodiments.

FIG. 4 shows an example architecture for converting a natural language query to a structured query, in accordance with one or more embodiments. The architecture (400) shown in FIG. 4 is a specific example of the system shown in FIG. 1.

In the example of FIG. 4, a user submits a natural language query (402). The natural language query is "find well located in Texas."

First the question is passed through an extractor and/or models (404). In an embodiment, a custom trained named entity recognizer (NER) and semantic parsers like dependency parsers and parts of speech taggers are used to tag the sentence. Using the output of these parsers, rules for recognition of different verb and noun phrases in the sentence are applied. For example, in FIG. 4, the phrase detection system has identified "Wells" and "Texas" as noun phrases and "Find" and "Located" as verb phrases. These phrases generate the candidates of the entity resolution algorithm.

The phrases might not be resolved using the entity resolution model. For example, "Texas" is identified as a location using the NER model. The phrases which are not matched like "Located in" and "Wells" are passed through the entity linking block (406), which matches these phrases to entities in a graph data structure (408) or terms in an ontology (410) using one or more indices (412) derived from the ontology (410).

In this example "Located in" is matched to <gv:in> predicate and "Wells" is matched to <gv:well> subject in the ontology. Furthermore, if in case "Texas" was not resolved using the NER model in previous block, the one or more indices may be used again to perform the entity linking. This procedure provides a good fallback for the failures of the NER model.

Once the entities are matched to either the ontology (410) or to the entities inside the graph data structure (408), connections are found between these entities inside the graph data structure (408). These connections or paths are not apparent and might not be explicit in the natural language query (402). However, the meta layer of the graph data structure (408) can be used to discover these connections automatically using path finding algorithms described above (and shown in FIG. 7).

The connections are the set of paths which are used to generate a valid SPARQL query. The set of paths are generated from the meta graph (414) shown in FIG. 4.

After the set of paths (the meta graph (414)) is generated, the set of paths are converted into the final results (416), which is one or more SPARQL queries (i.e., one or more structured language queries). As indicated above, pseudo code of the procedure is shown in FIG. 8. In summary, each identified path in the previous block is checked. Each edge in the path is converted into a triple of subject, predicate and object. The variable which is to be displayed is tracked and, ultimately, the triples are combined to generate an executable SPARQL query.

Figure 5:
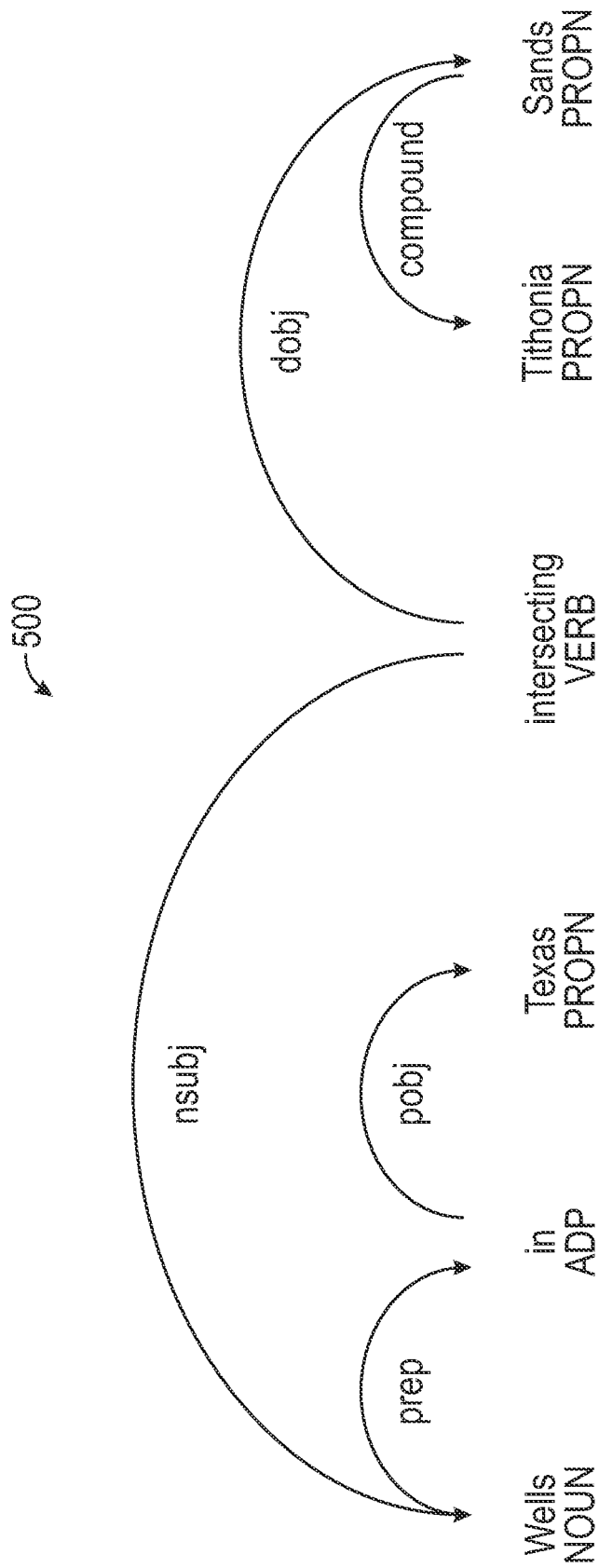
FIG. 5 shows an example of use of a parser, in accordance with one or more embodiments.

FIG. 5 shows an example of use of a parser, in accordance with one or more embodiments. The parsed natural language query (500) may be generated using the SPACY® natural language processing library. The SPACY® transformer model may be used as the base embedding model for other parsers. The parts of speech tags (shown in capital letters) and dependency parsers are output by the parser.

In addition, a named entity recognition model is used in addition to the SPACY® transformer model to perform entity resolution. The data for training the named entity recognition model is generated from inside the graph data structure, and may be augmented using additional data. Entity extraction rules may be used to identify noun phrases and verb phrases in this block.

FIG. 6 shows pseudocode for an algorithm for linking phrases to an ontology, in accordance with one or more embodiments. The pseudo code (600) shown in FIG. 6 may be used to implement block 204 of FIG. 2, as well as the linking described above with respect to FIG. 4.

As described with respect to FIG. 2, the linking algorithm of FIG. 6 takes the input phrase, an index, and a threshold value, above which the match is acceptable. Again, the index is the list of phrases generated from the meta layer of the graph data structure that can be matched to the input phrase. This index also includes the synonyms of various entities described in the ontology using, for example, skos:prefLabels and skos:altLabels. As mentioned above, this approach improves the coverage of the algorithm, as the user can refer a single entity with multiple names. For example, the term "wells" can also be referred to as wellbores or oil wells.

One or more embodiments may use a Jaro-Winkler similarity as the string similarity matrix of choice, because this approach generated values between [0, 1] and is similar to edit distance 0 means completely dissimilar and 1 means exact match. The Equation for Jaro-Winkler similarity is displayed below.

Say two strings are compared, denoted by S1 and S2. Let:
|S1| denote the length of S1,
m be the number of "matching characters"
t be the number of "transpositions".
Then, the Jaro-Winkler similarity is $$\text{sim}_j = \begin{cases} 0 & \text{if } m = 0 \\ \frac{1}{3}\left(\frac{m}{|s_1|} + \frac{m}{|s_2|} + \frac{m-t}{m}\right) & \text{otherwise} \end{cases}$$

FIG. 7 shows pseudocode for an algorithm for generating an execution plan, in accordance with one or more embodiments. The pseudo code (700) of FIG. 7 may be used to implement block 206 of FIG. 2, or with respect to the example of FIG. 4.

Once the phrases are linked to the appropriate entity, an execution plan is generated. An execution plan is set of paths in the meta layer of the graph data structure that connect those entities (in the first layer of the graph data structure) which are associated with the parsed terms in the natural language query.

The algorithm of FIG. 7 takes, as input, the input phrases and the corresponding linked entities from the prior blocks. Note that the linked entities and input phrases may be of same length. The algorithm goes through each of the entities in the matched entity array and checks if each entity is present in in the ontology or not. If an entity is present in the ontology, the algorithm adds the entity to the entity type array. Otherwise, the algorithm calls for another procedure.

The other procedure may be, for example, a "find type" procedure, which determines the type of the entity and then performs the same block as adding the entity to the entity type array. The function "find type" has two ways to determine the type of the given entity. First, the function can analyze the output of the named entity recognition model. Second, the function can look at the ontology itself to find the type.

Next, the algorithm of FIG. 7 generates permutations of entity URIs (uniform resource indicators) and tries within the graph data structure to find paths between the URIs using the meta layer of the graph data structure. For example, a NetworkX implementation of a breadth first search (BFS) algorithm may be used for finding a path in the meta layer of the graph data structure. As there is possibility of finding multiple paths in the meta layer, the paths may be ranked using two factors as shown in the algorithm of FIG. 7.

The following are two factors considered for the ranking of multiple paths. The first is context similarity. Context similarity may be the primary factor for ranking the paths. Context similarity may be the Jaccard similarity between the identified path and the entities referred in the natural language query. For example:

if A=set of entities in identified path and B=set of linked entities referred in natural language query, then
then $$\text{Jaccard Similarity} = \frac{A \cap B}{A \cup B}$$

The path with the higher context similarity may be the selected path.

The second factor is the length of the path. The shorter the path the more likely a candidate path will be the selected path.

Next, one or more embodiments adds the identified path to the execution plan. Finally, the overlapping paths are merged, and the duplicate paths are removed. The resulting set of paths is returned for conversion to the structured query language.

FIG. 8 shows pseudocode for an algorithm for generating a structured query which can be executed on a graph data structure using a structured query language endpoint, in accordance with one or more embodiments. The input to the algorithm shown in FIG. 8 may be the output of the algorithm in FIG. 7. The algorithm of FIG. 8 may be used to perform block 208 of FIG. 2.

The algorithm of FIG. 8 goes through each path identified in the previous block (i.e., the set of paths generated by the algorithm of FIG. 7) and inside each path the algorithm goes through each edge of the path. The pseudo code (800) of FIG. 8 converts each edge into a triple of subject, predicate and object. Generation of these triples is performed using the function "formatTriples," which determines if the uniform resource indicator (URI) of an entity or edge in the graph is an entity or entity type, or if the entity should be skipped. The algorithm tracks the variable which should be displayed and, in the end, combines generated triples to generate an executable structured query language (in this case, a SPARQL query).

Figure 9:
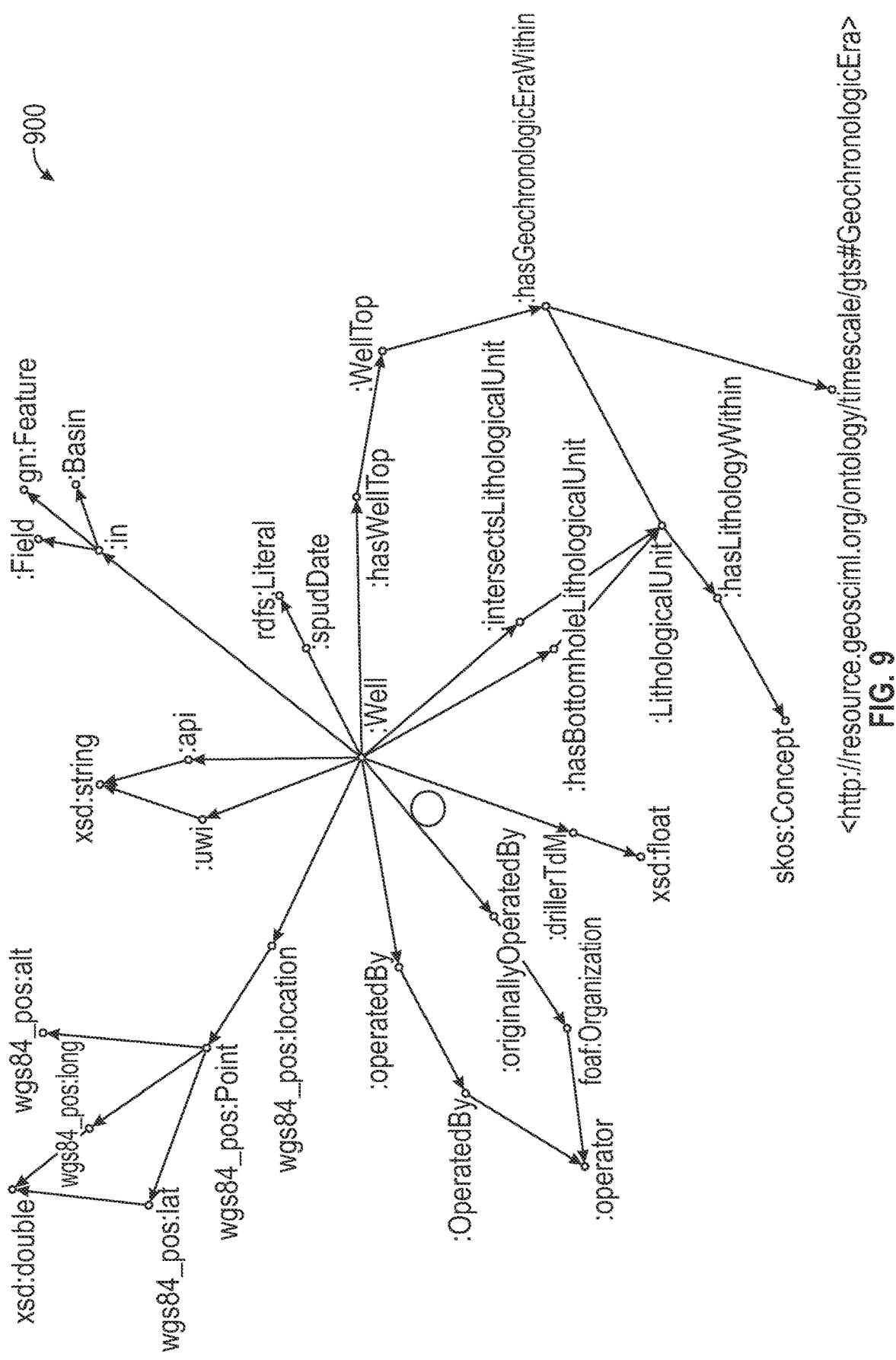
FIG. 9 shows an example of an ontology graph, in accordance with one or more embodiments.

FIG. 9 shows an example of an ontology graph, in accordance with one or more embodiments. The ontology (900) of FIG. 9 may contain selected entities from some other available ontology, such as like the web ontology language (OWL). The ontology graph defines the relationships between terms. The terms will form nodes of the graph data structure, and the relationships will be used to form the edges of the graph data structure.

FIG. 10 shows pseudocode for an algorithm for retrieving edges which have a desired meta annotation, in accordance with one or more embodiments. The pseudo code (1000) of FIG. 10, when executed, obtains the edges "s" which have tags, and their respective domain and range.

FIG. 11 shows pseudocode for converting information in edges obtained in the algorithm of FIG. 8 to convert the edges to a searchable graph, such as shown in FIG. 7, in accordance with one or more embodiments. The pseudo code (1100) of FIG. 11, when executed, converts the ontology (900) of FIG. 9 into a searchable graph data structure. Thus, FIG. 9 represents pseudo code for executing block 304 of FIG. 3. However, the multi-layer graph data structure is not complete yet.

FIG. 12 shows pseudocode for an algorithm for searching relations in a searchable graph, such as shown in FIG. 7, in accordance with one or more embodiments. Specifically, the pseudo code (1200) of FIG. 12 may be used to search for additional edges (see block 306 of FIG. 3). For any given two nodes inside the graph data structure, a graph search algorithm may be used to search for paths or relations between the start and end nodes. Examples of such graph search algorithms include a breadth first search (BFS) algorithm, a depth first search (DFS) algorithm, or a Dijkstra algorithm.

The multi-layer graph data structure (e.g., the graph data structure (108) of FIG. 1) can be derived from an ontology by manually annotating edges of interests inside the ontology. For example, <gv:meta> annotations can be added on the edges of interest which are to be exposed to the natural language query to the structured language conversion system. A code is then written to retrieve these annotations from the graph data structure directly and triples are converted to edges inside a NetworkX graph. By directly retrieving this information from a graph data structure, the system can be updated by updating the ontology inside the graph data structure.

The protégé user interface may be used to add the annotations, though other ontology editors also can be used to do the same to expose a natural language query to a structured language conversion system. The annotations are then retrieved from the graph data structure directly. The triples are converted to edges inside a NetworkX graph. Again, a triple represents an edge in a graph data structure, but an annotation is a special flag on some triples which is used to demarcate a triple as part of the meta layer. By directly retrieving this information from the graph data structure, the system can be updated by just updating the ontology inside the graph data structure. Thus, the system remains updated as the graph data structure expands.

The example of FIG. 4 through FIG. 12 may be summarized as follows. Referring to FIG. 4, the user submits the following query: "find wells located in Texas". First, the question is passed through parsers, such as the extractor/models. A trained named entity recognizer machine learning model and a semantic parser (like dependency parsers and part of speech taggers) are used to tag the sentence. Using the output of these parsers, rules are used to recognize different verb and noun phrases in the sentence. For example, in FIG. 4, the phrase detection system identified "wells" and "Texas" as noun phrases and "Find" and "Located" as verb phrases. These phrases generate the candidates of the entity resolution algorithm.

Few of the phrases are resolved using an entity resolution model. In the above example, the word "Texas" is identified as a location using a named entity recognition (NER) machine learning model. The phrases which are not matched, such as "Located in" and "Wells" are passed through an entity linking block which matches these phrases using various indices derived from the graph data structure. In the example, the term "Located in" is matched to a <gv:in> predicate and the term "Wells" is matched to a <gv:well> subject in the ontology. Furthermore, if the term "Texas" was not resolved using the named entity recognition model in the previous block, one or more embodiments can use the index again to perform entity linking. This process provides a good fallback for failures of the named entity recognition model.

Once the entities are matched to either the ontology or to the entities inside the graph data structure, one or more embodiments find the connections between entities inside the graph data structure. The connections or paths are not apparent and might not be explicit in the natural language query. However, the meta layer of one or more embodiments address this problem because the meta layer can be used to discover such connections automatically using path-finding algorithms on the meta layer of the graph data structure.

Using the linked entities and the meta layer, one or more embodiments find the set of paths. The set of paths are used to generate a valid structured query. Once the set of paths are discovered, the paths are converted to a well-formed structured query using an algorithm defined above. There is a possibility of generating multiple queries due to the possibility having ambiguity in the natural language. Ambiguity is addressed by executing the multiple queries and displaying the results of the multiple queries. The user selects results from among the multiple results that are presented.

Thus, one or more embodiments include converting a natural language query, specifically English language query, into a well-formed structured query (e.g., in SPARQL) which can be executed on the related graph data structure. A translation layer is presented which is derived from the ontology of the graph data structure. The translation layer is the set of paths, as described above. However, the translation layer may be referred to as a "meta graph" (in the architecture of FIG. 4), because the set of paths that form the translation layer are paths in the meta layer of the graph data structure.

This translation layer can then be used to convert natural language entities to entities in the first layer of the graph data structure, and ensure that the generated query adheres to the ontology even if the natural language loosely refers to it. One or more embodiments also provide for an entity resolution algorithm which refers to various indices in the graph data structure to map the natural language entities to entities inside the graph data structure.

One or more embodiments provide technical solutions to technical problems. One technical problem is how to automatically convert a natural language query to a structured query language. Due to the constraints on a structured language queries, which may be database or data structure dependent as well as term specific, it is not straightforward to simply pick a word or words in a natural language query and place them into a structured query language. The technical solution to this technical problem is described in detailed description above, but again in brief summary, a graph data structure (which may be referred to as an ontological knowledge graph) is used to perform the conversion. The graph data structure includes a first layer of nodes and edges, and a meta layer (also known as an abstraction layer over the first layer). Another technical problem is how to automatically build the ontological knowledge graph (for use in converting natural language queries to structured language queries) from a relational database or from a set of terms. The technical solution to this problem is described in detail above, but again briefly, the ontological knowledge graph is established by defining an ontology of terms, defining edges (relationships) between the terms, and then building the graph data structure from the terms (nodes) and relationships (edges).

One or more embodiments have multiple applications across a variety of technology areas. For example, one or more embodiments may be used with respect to wellbore construction by improving searches performed on a graph database containing the data. In a similar manner, one or more embodiments may help drilling engineers explore past experiences and thus plan for future drilling operations.

One or more embodiments may be used to provide a natural language interface to a user. Thus, one or more embodiments may provide for easy access to, and exploration of, complex data.

One or more embodiments may be used without the use of machine learning models (e.g., without using a natural language model to parse the terms of the natural language query). Thus, one or more embodiments may avoid the use of training data, in some cases.

One or more embodiments can be integrated with transformer-based language conversion methods to create a hybrid method for querying large structured query language databases. The hybrid model can overcome a combination of limitations of a transformer-based language conversion method and difficulties in using a knowledge-graph based method. For example, multiple structured query language queries are not possible with the transformer approach, and complex quantitative queries are difficult when using a graph data structure method. However, a hybrid approach can overcome both issues concurrently. In addition, using large labeled datasets, one or more transformer models can be trained to generate SPARQL queries from natural language queries.

Another use of one or more embodiments is to connect multiple datasets using the graph data structure. One or more embodiments also provide an easy-to-use natural language interface for interacting with graph data structures for users who are not experts at forming structured language queries.

Additionally, the meta layer of one or more embodiments helps the user form a picture of the data inside a graph data structure that can be used to pose new questions to the graph data structure. Thus, one or more embodiments may be used to prompt user to form better natural language queries, or to use the available data in new ways.

One or more embodiments may use structures data from SQL tables, which can be loaded inside the graph data structure. Thus, one or more embodiments derives knowledge from the graph data structure and the corresponding ontology. Accordingly, one or more embodiments may avoid the use specialized data for training large natural language processing machine learning models, like transformer machine learning models.

Other than these examples these applications one or more embodiments can be used in other context where it is desirable to convert a natural language to a structured query. Thus, one or more embodiments are not necessarily limited to the examples presented herein.

One or more embodiments may be implemented on a computing system specifically designed to achieve an improved technological result. When implemented in a computing system, the features and elements of the disclosure provide a technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 13.1, the computing system (1300) may include one or more computer processor(s) (1302), non-persistent storage device(s) (1304), persistent storage device(s) (1306), a communication interface (1308) (e.g., Bluetooth interface, infrared interface, network interface, optical interface, etc.), and numerous other elements and functionalities that implement the features and elements of the disclosure. The computer processor(s) (1302) may be an integrated circuit for processing instructions. The computer processor(s) may be one or more cores or micro-cores of a processor. The computer processor(s) (1302) includes one or more processors. The one or more processors may include a central processing unit (CPU), a graphics processing unit (GPU), a tensor processing units (TPU), combinations thereof, etc.

The input devices (1310) may include a touchscreen, keyboard, mouse, microphone, touchpad, electronic pen, or any other type of input device. The input devices (1310) may receive inputs from a user that are responsive to data and messages presented by the output devices (1312). The inputs may include text input, audio input, video input, etc., which may be processed and transmitted by the computing system (1300) in accordance with the disclosure. The communication interface (1308) may include an integrated circuit for connecting the computing system (1300) to a network (not shown) (e.g., a local area network (LAN), a wide area network (WAN) such as the Internet, mobile network, or any other type of network) and/or to another device, such as another computing device.

Further, the output devices (1312) may include a display device, a printer, external storage, or any other output device. One or more of the output devices may be the same or different from the input device(s). The input and output device(s) may be locally or remotely connected to the computer processor(s) (1302). Many different types of computing systems exist, and the aforementioned input and output device(s) may take other forms. The output devices (1312) may display data and messages that are transmitted and received by the computing system (1300). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments, which may include transmitting, receiving, presenting, and displaying data and messages described in the other figures of the disclosure.

The computing system (1300) in FIG. 13.1 may be connected to or be a part of a network. For example, as shown in FIG. 13.2, the network (1320) may include multiple nodes (e.g., node X (1322), node Y (1324)). Each node may correspond to a computing system, such as the computing system shown in FIG. 13.1, or a group of nodes combined may correspond to the computing system shown in FIG. 13.1. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (1300) may be located at a remote location and connected to the other elements over a network.

The nodes (e.g., node X (1322), node Y (1324)) in the network (1320) may be configured to provide services for a client device (1326), including receiving requests and transmitting responses to the client device (1326). For example, the nodes may be part of a cloud computing system. The client device (1326) may be a computing system, such as the computing system shown in FIG. 13.1. Further, the client device (1326) may include and/or perform at least a portion of one or more embodiments.

The computing system of FIG. 13.1 may include functionality to present raw and/or processed data, such as results of comparisons and other processing. For example, presenting data may be accomplished through various presenting methods. Specifically, data may be presented by being displayed in a user interface, transmitted to a different computing system, and stored. The user interface may include a GUI that displays information on a display device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be temporary, permanent, or semi-permanent communication channel between two entities.

The various descriptions of the figures may be combined and may include or be included within the features described in the other figures of the application. The various elements, systems, components, and blocks shown in the figures may be omitted, repeated, combined, and/or altered as shown from the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Further, unless expressly stated otherwise, the word "or" is an "inclusive or" and, as such includes "and." Further, items joined by an or may include any combination of the items with any number of each item unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope may be limited by the attached claims.

What is claimed is:

1. A method comprising:
    parsing a natural language query to generate a plurality of terms extracted from the natural language query;
    linking the plurality of terms to a plurality of entities of a graph data structure, wherein:
        the graph data structure comprises a first layer of a plurality of nodes connected by a plurality of edges,
        the plurality of entities are selected from among the plurality of nodes and the plurality of edges,
        the graph data structure further comprises a meta layer comprising a plurality of tags associated with the plurality of edges and the plurality of nodes,
        the plurality of tags define an ontology for the plurality of entities, and
        a term in the plurality of terms is linked to an entity in the plurality of entities when the term matches the entity;
    generating a set of paths between selected tags of the plurality of tags in the meta layer of the graph data structure, wherein each of the selected tags is associated with a corresponding edge in the graph data structure that matches a corresponding term in the plurality of terms extracted from the natural language query; and
    converting the set of paths into a structured query language statement.

2. The method of claim 1, wherein converting the set of paths into a structured query language statement comprises:
    identifying a subset of edges in the first layer of the graph data structure that correspond to the selected tags;
    converting the subset of edges into a corresponding plurality of triples, wherein each triple comprises a corresponding subject, a corresponding predicate, and a corresponding object; and
    converting the corresponding plurality of triples into the structured query language statement.

3. The method of claim 1, wherein at least some of the plurality of tags further define a corresponding alternative term for a corresponding term in the plurality of terms.

4. The method of claim 3, wherein linking further comprises:
    linking the corresponding term to a corresponding entity when the corresponding alternative term matches the corresponding entity.

5. The method of claim 1, further comprising:
    executing the structured query language statement on a knowledge graph or graph database.

6. The method of claim 1, further comprising:
    building, prior to linking, the graph data structure from a database.

7. The method of claim 1, further comprising:
    building the first layer of the graph data structure from a database; and
    building, after building the first layer, the meta layer of the graph data structure.

8. The method of claim 7, wherein building the meta layer comprises:
    receiving the plurality of tags; and
    associating the plurality of tags with corresponding ones of the plurality of edges.

9. The method of claim 1, wherein parsing comprises inputting the natural language query to a natural language processing machine learning model, and executing the natural language processing machine learning model to output the plurality of terms.

10. The method of claim 1, wherein the linking comprises:
    generating a comparison value by comparing a candidate term of the plurality of terms to an index generated from the graph data structure,
        wherein the index comprises the plurality of entities of the graph data structure, and
        wherein the comparison value is generated by comparing the candidate term to a selected entity in the plurality of entities;
    comparing the comparison value to a threshold value; and
    linking, responsive to the comparison value satisfying the threshold value, the candidate term to the selected entity.

11. The method of claim 10, wherein comparing is performed using a Jaro-Winkler similarity test.

12. The method of claim 1, wherein generating the set of paths further comprises:
    checking whether a selected entity in the plurality of entities has a corresponding tag representing a corresponding ontological definition; and
    adding, when the selected entity has the corresponding tag, the selected entity to an entity array, wherein the selected entity is identified as having an entity type of the corresponding tag.

13. The method of claim 12, further comprising:
    identifying, when the selected entity does not have the corresponding tag, an identified entity type of the selected entity; and
    adding the selected entity to the entity array, wherein the selected entity is identified as having the entity type corresponding to the identified entity type.

14. The method of claim 13, further comprising:
    identifying a plurality of paths among entities in the entity array.

15. The method of claim 1, further comprising:
    checking whether a selected entity in the plurality of entities has a corresponding tag representing a corresponding ontological definition;
    adding, when the selected entity has the corresponding tag, the selected entity to an entity array, wherein the selected entity is identified as having an entity type of the corresponding tag;
    identifying a plurality of paths among entities in the entity array;
    merging overlapping paths from the plurality of paths; and
    wherein generating the set of paths comprises removing duplicate paths from the plurality of paths.

16. The method of claim 1, wherein generating the set of paths comprises one of:
- selecting the set of paths from a plurality of paths using a highest context similarity metric;
- selecting the set of paths using a shortest length path; and combinations thereof.

17. The method of claim 16, wherein the highest context similarity metric is determined using a Jaccard similarity between an identified path in the plurality of paths and one or more linked entities, the linked entities comprising those entities in the graph data structure that were linked to the plurality of terms of the natural language query.

18. The method of claim 1, wherein converting the set of paths into a structured query language statement comprises:
- converting the set of paths into corresponding triples of a corresponding subject, a corresponding predicate, and a corresponding object; and
- combining the corresponding triples into the structured query language statement.

19. A method comprising:
- extracting a plurality of terms from a database;
- adding a plurality of annotations to an ontology that defines ontological relationships between the plurality of terms;
- converting the ontology into a graph data structure by establishing the plurality of terms as a plurality of nodes and by retrieving selected edges between the plurality of nodes from a graph search library, wherein the selected edges have the plurality of annotations;
- searching for additional edges among the plurality of nodes using a graph search algorithm that finds the additional edges between pairs of nodes in the plurality of nodes and a start node and an end node of the graph data structure; and
- adding the additional edges to the selected edges to generate a plurality of edges,
- wherein, after extracting, adding the plurality of annotations, converting, searching, and adding the additional edges, the graph data structure comprises a first layer comprising the plurality of nodes connected by the plurality of edges and a meta layer comprising the plurality of annotations associated with the plurality of edges.

20. A system comprising:
- a processor; and
- a data repository in communication with the processor, the data repository storing:
  - a natural language query,
  - a plurality of terms extracted from the natural language query,
  - a graph data structure comprising:
    - a first layer comprising a plurality of nodes connected by a plurality of edges,
    - a meta layer comprising a plurality of tags associated with the plurality of edges and the plurality of nodes,
    - a plurality of entities, wherein the plurality of entities are selected from among the plurality of nodes and the plurality of edges, and
      - wherein the plurality of tags define an ontology for the plurality of entities, and
    - a term in the plurality of terms is linked to an entity in the plurality of entities when the term matches the entity,
  - a set of paths between selected tags of the plurality of tags in the meta layer of the graph data structure, wherein:
    - each of the selected tags is associated with a corresponding edge in the graph data structure that matches a corresponding term in the plurality of terms extracted from the natural language query, and
  - a structured query language statement; and
- a server application in communication with the data repository and which, when executed by the processor, is configured to perform a computer-implemented method comprising:
  - receiving the natural language query,
  - parsing the natural language query to generate the plurality of terms,
  - linking the plurality of terms to the plurality of entities of the graph data structure,
  - generating the set of paths between the selected tags in the meta layer of the graph data structure, and
  - converting the set of paths into the structured query language statement.

* * * * *